Figure 2:
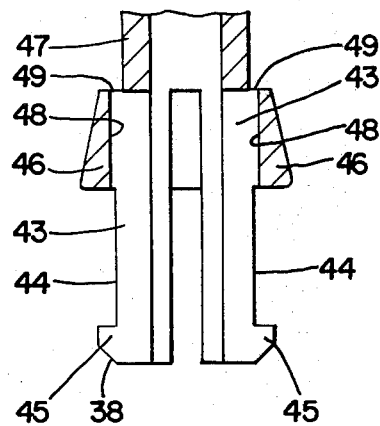

United States Patent [19]
Hoffman et al.

[11] 3,926,208
[45] Dec. 16, 1975

[54] PRESSURE REGULATOR

[75] Inventors: Robert Kendall Hoffman, Plainwell, Mich.

[73] Assignee: Parker-Hannifin Corporation, Cleveland, Ohio

[22] Filed: June 20, 1974

[21] Appl. No.: 481,152

[52] U.S. Cl. ..... 137/484.8; 137/505.18; 137/505.42
[51] Int. Cl.² .......................................... F16K 17/34
[58] Field of Search ....... 137/484.2, 505.18, 505.26, 137/116.5, 116.3, 315, 484.8, 505.34, 505.37; 251/282, 357

[56] References Cited
UNITED STATES PATENTS

| | | | |
|---|---|---|---|
| 2,599,577 | 6/1952 | Norgen | 137/505.18 X |
| 2,707,966 | 5/1955 | Taplin | 137/116.5 |
| 3,064,670 | 11/1962 | Peras | 137/505.18 X |
| 3,095,897 | 7/1963 | Pennstrom | 137/505.18 X |
| 3,126,907 | 3/1964 | Tischler et al. | 251/357 X |
| 3,204,657 | 9/1965 | Boyd | 137/116.5 X |
| 3,214,913 | 11/1965 | Hayman et al. | 137/505.18 X |
| 3,251,376 | 5/1966 | Worden | 137/505.26 X |

*Primary Examiner*—Martin P. Schwadron
*Assistant Examiner*—Robert J. Miller
*Attorney, Agent, or Firm*—John N. Wolfram

[57] ABSTRACT

A pressure regulator having a balanced poppet valve with a stem snap fitted thereto. The poppet valve has a skirt that forms a balancing chamber that is sealed by a packing ring that engages the inner wall of the skirt. The stem is connected to the poppet valve by an annular portion that extends through an opening in the poppet valve and has radial projections integral therewith to engage opposite sides of the poppet valve to fix the latter in an axial position on the stem. The annular portion has axial slots to form fingers carrying one set of the projections at the free ends of the fingers and the fingers are flexible so that they may be bent inward on to permit the projections on their free end to pass through the poppet valve opening for assembling the parts. The fingers then snap outward to lock the poppet valve to the stem. A sleeve is then insertable into the annular portion to prevent accidental bending of the fingers to release the poppet valve from the stem. The stem also provides a passage connecting a high velocity section of the main passage controlled by the valve poppet with a control chamber for providing improved operating results.

13 Claims, 3 Drawing Figures

U.S. Patent    Dec. 16, 1975    3,926,208

3,926,208

PRESSURE REGULATOR

BACKGROUND OF THE INVENTION

In pressure regulators it is desirable to substantially balance fluid pressures acting on the upstream and downstream sides of the valve element that controls flow of fluid through the regulator so that variations in inlet pressure will have minimal effect on opening or closing of the valve. In previous regulator designs, such as disclosed in U.S. Pat. No. 2,761,464, the valve element has a depending cylindrical portion that fits into a bore in a housing member to form a balancing chamber and there is a packing in an external groove of the cylindrical portion that seals the chamber. The cylindrical portion is a close slide fit within the housing bore for guiding the valve and there is a spring within the balancing chamber that engages the valve element to move it toward closed position. This spring is of relatively small diameter and contributes little to the guiding of the valve element, and the valve element is relatively long and bulky.

Also, in prior regulator designs the valve element has been attached to an operating stem by either threaded or press fitted parts that are either expensive to manufacture or assemble or which are not completely reliable. Thus, in U.S. Pat. No. 3,631,878, the stem provides a shoulder for abutting one side of the valve element and a rivet press fitted into a bore of the stem provides a shoulder for abutting the other side of the valve element. The press fit of the rivet in the stem must be very tight to be sure that it will not slip and result in loosening of the valve element on the stem. However, a very tight press fit makes it difficult to disassemble the parts and also may be difficult to achieve without breaking the stem, which is preferably of plastic material.

SUMMARY OF THE INVENTION

The present invention provides a pressure regulator in which the valve element has a depending skirt that fits over a pin mounted in the housing to form a balancing chamber. The pin supports a packing that engages the interior wall of the skirt for sealing the balancing chamber from the valve inlet. A spring of relatively large diameter fits over the outer surface of the skirt to engage the valve element for moving it toward closed position and assists in guiding the valve element in its opening and closing movement.

An opening stem is attached to the valve element by means of an annular portion that extends through an opening in the valve element. The annular portion has axially spaced radial projections that are integral with the stem and which engage opposite sides of the valve head to fix the axial position of the valve element on the stem. The annular portion has axially extending circumferentially spaced slots that form fingers and one set of the radial projections are on the free ends of the fingers. The fingers are bendable to permit the radial projections at their free ends to be inserted through the valve opening. When all the way through, the fingers snap outwardly to lock the valve element in position on the stem. A tubular member may be press fitted into the annular portion to prevent accidental flexing of the fingers radially inwardly which might otherwise release the valve element from the stem.

The slots in the annular portion and a central opening through the stem connect both the balancing chamber and a control chamber with a downstream portion of the passage through the regulator that is subject to high velocity flow whereby to further improve the operating characteristics of the regulator.

DETAIL DESCRIPTION

Figure 1:
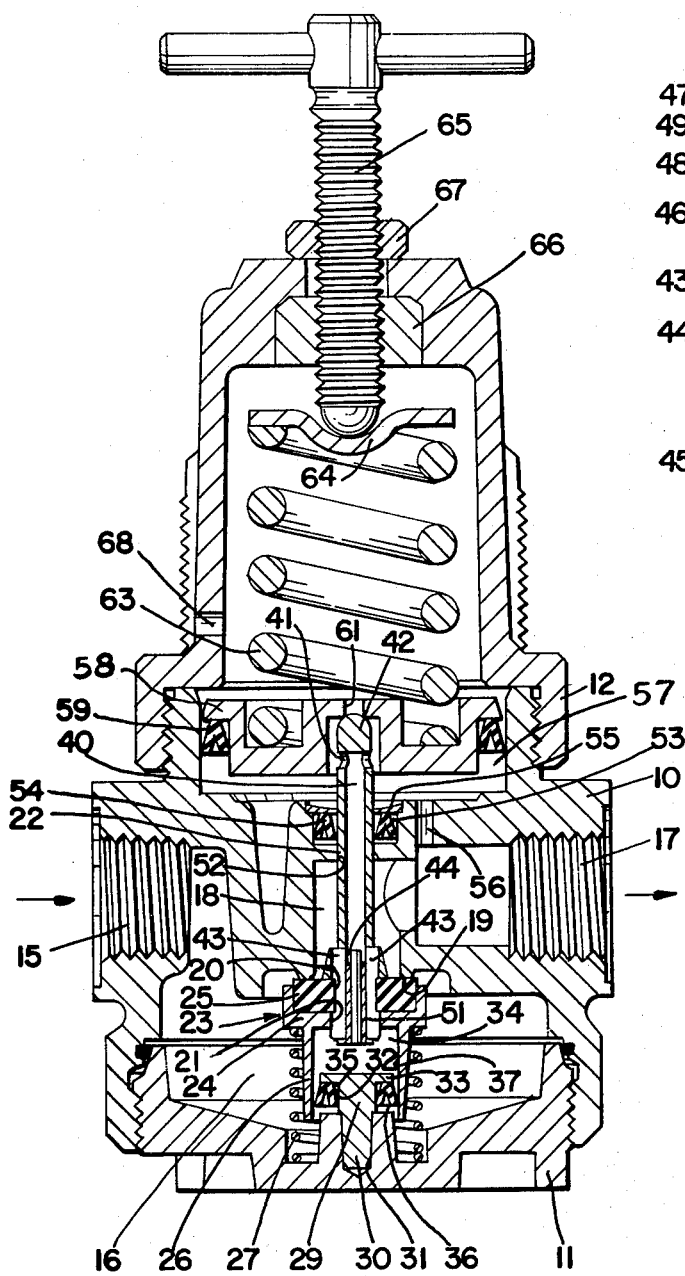
Figure 3:
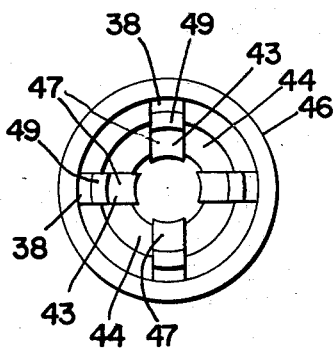

FIG. 1 is a cross section view through the regulator.
FIG. 2 is an enlarged fragmentary view of the slotted annular portion of the stem.
FIG. 3 is a bottom view of the stem.

The regulator includes a housing comprised of a body 10, a lower cap 11 and a bonnet 12, each threadably connected to body 10.

Body 10 and cap 11 form a main passageway through the housing that comprises an inlet portion 15, an upstream chamber or passage portion 16, and outlet port 17, and a downstream generally cylindrical passage portion 18 that is separated from upstream chamber 16 by an annular valve seat 19.

Mounted within the housing is a valve assembly comprising a poppet valve 23 and a stem 22. Poppet valve 23 includes a member 24 having an elastomeric washer 25 within a recess in member 24. Poppet member 24 has a depending skirt 26 surrounded by a spring 27 that bears against cap 11 and against a shoulder on poppet member 24 for constantly urging the poppet toward its closed position against seat 19. Washer 25 and poppet member 24 have aligned openings 20, 21 therethrough.

A pin 29 has an end portion 30 press fitted or otherwise anchored within a bore 31 in cap 11 and has a cylindrical surface 32 and a flange 33 that with skirt 26 forms a packing chamber 35 in which an elastomeric V-type packing ring 36 is mounted and which has sealed engagement with pin wall 32 and the interior wall 37 of skirt 26.

Stem 22 has a bore 40 therein extending from its lower end to a cross bore 41 near its upper end which is rounded as at 42 to form a valve face. The lower end of stem 22 has axial slots 43 that form fingers 44. As best shown in FIGS. 2 and 3, fingers 44 have radial projections 45 at their lower ends whose outer edges normally lie in a circle having a greater diameter than openings 20, 21 and have tapered end faces 38 whose smallest diameter is smaller than the diameter of openings 20, 21. Adjacent the upper ends of the fingers 44 is an annular circumferentially continuous radially outwardly projecting flange 46. Slots 43 that form fingers 44 extend vertically upwardly through flange 46 to a reduced diameter portion 47 of the stem and extend radially outwardly to a wall portion 48 that is radially outwardly of stem portion 47 so as to form openings 49 between stem portion 47 and annular flange 46.

Stem 22 is guided by bore 52 in a wall of body 10 and passes through a packing chamber 53. An elastomeric V-type packing 54 is in sealing contact with the stem and with an outer wall of chamber 53. A washer 55 press fitted into a counterbore of body 10 closes the upper end of packing chamber 53.

Body 10 has a control chamber 57 which is closed by a piston 58 movably mounted therein and sealed by an elastomeric V-type packing ring 59. Piston 58 has a central relief opening 61 therethrough that is normally closed by valve face 42. An aspirating opening 56 connects chamber 57 with outlet port 17.

Within bonnet 12 is a spring 63 that bears on piston 58 and also on a spring rest 64. An adjusting screw 65 is threaded through a nut 66 press fitted or otherwise anchored within bonnet 12 and there is a lock nut 67 for locking the adjusted position of screw 65. An opening 68 connects the interior of the bonnet with atmosphere.

OPERATION

When there is no fluid pressure in either of the inlet and outlet ports 15 and 17, spring 63 moves piston 58, stem 22 and poppet valve 23 downwardly to an open position against the light pressure of spring 27 and such opening movement is limited by contact of sleeve 51 with pin 29.

Upon fluid pressure being applied to inlet port 15 and upstream passage or chamber 16, a closing force will be exerted upon valve poppet 23 by the pressurized fluid in chamber 16 as determined by the difference in areas bounded by valve seat 19 and inner wall 37 of poppet skirt 26. These areas may be termed as substantially equal but in fact it is preferable to have the area bounded by skirt wall 37 slightly less than that bounded by seat 19 so that there will be a small effective area acted upon by fluid in chamber 16 for urging the valve poppet toward its closed position.

As fluid flows through the regulator, its rate of flow depends upon the resistance to flow exerted by the fluid pressure operated unit to which the regulated fluid is being delivered. If the resistance is low, the rate of flow is high in order for the pressure in outlet port 17 to build up to the predetermined regulated value determined by the setting of spring 63. As the fluid flows from downstream passage portion 18 through outlet port 17, its pressure is sensed and transmitted by passage 56 to chamber 57 where it acts on piston 58 to raise the same against the force of spring 63. This permits spring 27 and the slight fluid pressure unbalance on poppet 23 to move the poppet toward closed position, valve face 42 remaining in contact with piston 58 for closing relief opening 61. At the same time, pressure fluid flowing through downstream passage 18 is sensed and transmitted through openings 49 and slots 43 to passage 40 of stem 22 and through sleeve 51 to balancing chamber 34. Because of the pressure drop between valve seat 19 and poppet valve 23, and the increased velocity of the fluid as it passes through the relatively restricted area between stem 22 and the circular wall of chamber 18, the pressure of the fluid transmitted to chamber 34 will be lower than that in upstream chamber 16 and the lips of V-packing 36 will be maintained in sealing engagement with pin wall 32 and skirt wall 37 by the difference of these pressures.

Also, the lowered pressure in stem passage 40 communicates through cross passage 41 with chamber 57 so that the pressure in the latter is somewhat lower than it would be if pressure were communicated thereto only through passage 56. This compensates for the lowering of the force of spring 63 upon piston 58 as this spring extends to maintain valve poppet 23 in its open position and consequently results in more nearly uniform regulated pressure at outlet 17 with varying rates of flow, this being a known phenomena in the industry.

When resistance to flow causes pressure in outlet port 17 to increase beyond the predetermined set pressure, the pressure increase will be transmitted through stem passage 40 and opening 56 to chamber 57 and raise piston 58 enough to permit poppet valve 23 to close. Any further increase in pressure in outlet port 17 and chamber 57 will cause piston 58 to rise still further and unseat from valve face 42 to permit venting of fluid from chamber 57 through port 61 and vent opening 68 to atmosphere.

To assemble valve stem 22 to valve poppet 23, the lower ends of fingers 45 are inserted through the openings 20, 21 in washer 25 and poppet member 24. At the beginning of such insertion, tapered surfaces 38 on the lower ends of the fingers engage the rim of washer opening 20 and cause the lower end of fingers 44 to be deflected radially inwardly so that projections 45 will pass through openings 20 and 21. When the projections 45 have passed completely through opening 21 fingers 44 will spring outwardly again so that projections 45 will prevent withdrawal of the stem from openings 20, 21. Projections 45 are axially spaced from annular flange 46 so that the poppet valve will be gripped therebetween with substantially no axial play. Because projections 45 and flange 46 are integral with the stem, there is no possibility that projections 45 and flange 46 will shift axially with respect to each other to give rise to axial play of the poppet assembly therebetween, as might occur with a non-integral construction. Also, washer 25, which is elastomeric, is slightly compressed axially so as to avoid axial play of washer 25 and poppet member 24 between the shoulders on projections 45 and annular flange 46.

Because packing ring 36 contacts an internal wall of poppet skirt 26, the skirt may be of thin wall and the poppet head may be likewise of thin wall so as to minimize the mass or weight of the poppet valve assembly. Also, by having spring 27 fit closely along the exterior of skirt 26, a larger diameter for spring 27 may be achieved for greater stability against cocking. By having packing 36 seal against an internal wall of skirt 26, the diameter of the packing may be minimized with consequent less friction against the poppet whereby unwanted interference with sensitive movement of the poppet in response to spring pressures and differential fluid pressures is minimized. Also, this arrangement permits seal 36 and the related sealing surfaces to be of smaller diameter to thus reduce cost thereof.

I claim:

1. In a fluid pressure regulator having a housing with a main passage therethrough that includes passage portions upstream and downstream of a valve seat, a valve element on the upstream side of the seat and having a head at one end thereof movable into and out of engagement with the seat for controlling flow through the passage, said valve element having a first area subject to downstream fluid pressure acting to unseat the valve element, a control chamber in the housing, a piston having one side thereof forming a movable wall of the control chamber, a spring on the other side of the piston pressing the piston toward the valve element, a stem connecting the valve element and the piston, and a first aspirating passage connecting the control chamber to the downstream passage portion; the improvement comprising a cylindrical skirt extending from the valve head into the upstream passage portion and being open at its end remote from the valve head, a packing slidably and sealingly engaging the inner wall of the skirt to form a balancing chamber within the skirt that is sealed from said upstream passage portion by said packing, said packing with the skirt defining an area on said valve element substantially the same as and opposite said first area, and a second passage connecting the balancing chamber to said downstream passage portion whereby fluid pressures acting on opposite sides of the valve element are substantially balanced, said housing includes a cap removably connected to the remainder of the housing and carrying said packing whereby upon separation of the cap from the remainder of the housing the packing is also removed from the remainder of the housing with the cap and is readily accessible for replacement.

2. The regulator of claim 1 in which there is a spring encircling said skirt and constantly pressing the valve element toward its closed position.

3. The regulator of claim 1 in which the cap includes a pin attached thereto and projecting into the open end of said skirt, and said packing is between said pin and the inner wall of said skirt and in sealing contact therewith.

4. The regulator of claim 3 in which said packing includes a lip movable into tight sealing engagement with said skirt when pressure in the upstream passage portion is greater than pressure in the downstream passage portion and is movable out of engagement with said skirt when pressure in the downstream passage portion is greater than pressure in the upstream passage portion.

5. In a fluid pressure regulator having a housing with a main passage therethrough that includes passage portions upstream and downstream of a valve seat, a valve element on the upstream side of the seat and having a head at one end thereof movable into and out of engagement with the seat for controlling flow through the passage, said valve element having a first area subject to downstream fluid pressure acting to unseat the valve element, a control chamber in the housing, a piston having one side thereof forming a movable wall of the control chamber, a spring on the other side of the piston pressing the piston toward the valve element, a stem connecting the valve element and the piston, and a first aspirating passage connecting the control chamber to the downstream passage portion; the improvement comprising a cylindrical skirt extending from the valve head into the upstream passage portion and being open at its end remote from the valve head, a packing slidably and sealingly engaging the inner wall of the skirt to form a balancing chamber within the skirt that is sealed from said upstream passage portion by said packing, said packing with the skirt defining an area on said valve element substantially the same as and opposite said first area, a pin attached to said housing projects into the open end of said skirt, said packing is between said pin and the inner wall of said skirt and in sealing contact therewith, said pin has a radially extending flange for retaining the packing ring on said pin, and a second passage connecting the balancing chamber to said downstream passage portion whereby fluid pressures acting on opposite sides of the valve element are substantially balanced.

6. The regulator of claim 3 in which said pin is engageable by the stem on the valve head to limit the opening movement of the valve element.

7. In a fluid pressure regulator having a housing with a main passage therethrough that includes passage portions upstream and downstream of a valve seat, a valve element on the upstream side of the seat and having a head at one end thereof movable into and out of engagement with the seat for controlling flow through the passage, said valve element having a first area subject to downstream fluid pressure acting to unseat the valve element, a control chamber in the housing, a piston having one side thereof forming a movable wall of the control chamber, a spring on the other side of the piston pressing the piston toward the valve element, a stem connecting the valve element and the piston, and a first aspirating passage connecting the control chamber to the downstream passage portion; the improvement comprising a cylindrical skirt extending from the valve head into the upstream passage portion and being open at its end remote from the valve head, a packing slidably and sealingly engaging the inner wall of the skirt to form a balancing chamber within the skirt that is sealed from said upstream passage portion by said packing, said packing with the skirt defining an area on said valve element substantially the same as and opposite said first area, and a second passage connecting the balancing chamber to said downstream passage portion whereby fluid pressures acting on opposite sides of the valve element are substantially balanced, said valve head having an opening therethrough, said stem having a lower end portion extending through said valve head opening and having an axial opening therein, a transverse slot in said end portion forming fingers, radial projections on the free ends of said fingers axially spaced from a radially extending portion on the stem adjacent the other end of said fingers, said projections and extending portions radially overlapping said valve head and engaging the same to fix the axial position of the valve element on said stem, and said fingers being of flexible material whereby the free ends of the fingers may be flexed radially inwardly to permit the radially projecting portions to pass through said valve head opening for assembly and disassembly thereof, and a passage through said stem connecting the axial opening of the stem with said downstream passage portion.

8. In a pressure regulator valve having a housing with a main passage therethrough that includes upstream and downstream portions with a valve seat therebetween, a valve assembly comprising a poppet and a stem, said poppet being movable into and out of engagement with said seat for controlling flow of fluid through said main passage, a control chamber in the housing, a piston in the control chamber having one side thereof exposed to fluid in the control chamber, a spring on the other side of the piston constantly urging the piston against the stem in a direction for moving the poppet to open position, an axial opening through said poppet, said stem having a lower end portion extending through said poppet opening and having an axial opening therethrough, a transverse slot in said end portion forming fingers on said lower end portion, radial projections on the free end of said fingers and axially spaced from a radially extending portion on the stem adjacent the other end of said fingers, said projections and said radially extending portion being normally on a greater diameter than the opening through the poppet and engaging opposite faces of the poppet to fix the axial position of the poppet on said stem, and said fingers being of flexible material whereby the free ends of the fingers may be flexed radially inwardly to permit the projections thereon to pass through said poppet opening for assembly and disassembly thereof.

9. The regulator of claim 8 in which there is a cylindrical sleeve removably mounted within said stem opening to prevent radially inward flexing of said fingers.

10. The regulator of claim 8 in which said radially extending portion comprises a continuous circular flange.

11. The regulator of claim 10 in which said stem has a reduced diameter portion adjacent said flange and said slot extends axially through said flange to said reduced diameter portion and extends radially in said flange portion to a diameter greater than that of the reduced diameter portion but less than that of the flange whereby said slot is open to the exterior of the reduced diameter portion.

12. The regulator of claim 8 in which said radialy projections have an end face adjacent the free ends of the fingers that tapers to a diameter smaller than the diameter of said poppet opening to facilitate entry of the fingers into said last mentioned opening.

13. The regulator of claim 11 in which said downstream passage portion includes a cylindrical portion that surrounds said stem to provide a passage cross section area around said stem that is smaller than the area of said downstream passage portion at the outlet end thereof, said slot is open to said downstream passage portion of lesser area, and said stem has a passage therethrough connecting the slot with said control chamber.

* * * * *